United States Patent [19]

Giles, Jr.

[11] 4,390,665
[45] Jun. 28, 1983

[54] POLYETHERIMIDE-EPDM TERPOLYMER BLENDS
[75] Inventor: Harold F. Giles, Jr., Cheshire, Mass.
[73] Assignee: General Electric Company, Pittsfield, Mass.
[21] Appl. No.: 359,258
[22] Filed: Mar. 18, 1982
[51] Int. Cl.³ ............................................... C08L 79/08
[52] U.S. Cl. .................................... 525/180; 525/184
[58] Field of Search ............................... 525/180, 184
[56] References Cited
U.S. PATENT DOCUMENTS
4,255,471  3/1981  Boldebuck .......................... 525/183

FOREIGN PATENT DOCUMENTS
55-18443  2/1980  Japan .................................. 525/184

Primary Examiner—Paul Lieberman
Attorney, Agent, or Firm—Bernard, Rothwell & Brown

[57] ABSTRACT

Disclosed are blends of (a) a polyetherimide and (b) a minor proportion of an EPDM terpolymer. Among other things, these blends have a higher impact strength throughout the range of normal operating temperatures than that associated with the polyetherimide component of the blends.

8 Claims, No Drawings

POLYETHERIMIDE-EPDM TERPOLYMER BLENDS

This invention relates to a class of polyetherimide-EPDM terpolymer blends. Among other things, these blends have a higher notched impact strength than that associated with the polyetherimide component of the blends.

The blends of the invention include a polyetherimide of the formula:

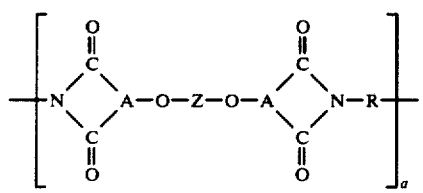

where a represents a whole number in excess of 1, e.g., 10 to 10,000 or more, the group —O—A< is selected from:

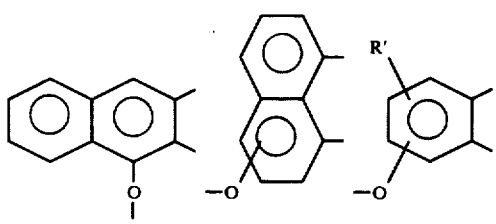

R' being hydrogen, lower alkyl or lower alkoxy, preferably a polyetherimide including the latter —O—A< group where R' is hydrogen such that the polyetherimide is of the formula:

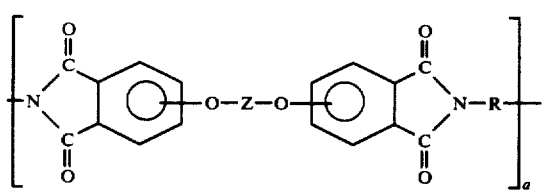

and the divalent bonds of the —O—Z—O— radical are in the 3,3'; 3,4'; 4,3' or the 4,4' position; Z is a member of the class consisting of (1)

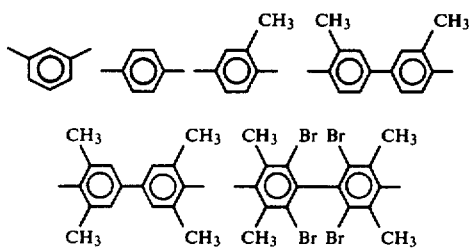

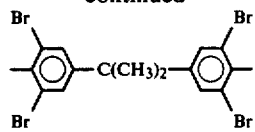

and (2) divalent organic radicals of the general formula:

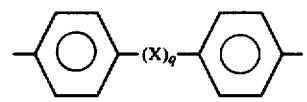

where X is a member selected from the class consisting of divalent radicals of the formulas,

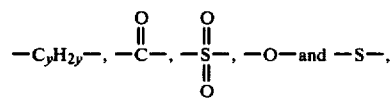

where q is 0 or 1, y is a whole number from 1 to 5, and R is a divalent organic radical selected from the class consisting of (1) aromatic hydrocarbon radicals having from 6-20 carbon atoms and halogenated derivatives thereof, (2) alkylene radicals and cycloalkylene radicals having from 2-20 carbon atoms, $C_{(2-8)}$ alkylene terminated polydiorganosiloxane, and (3) divalent radicals included by the formula

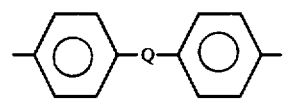

where Q is a member selected from the class consisting of

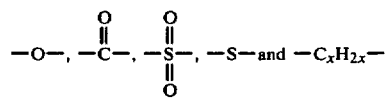

where x is a whole number from 1 to 5 inclusive. Particularly preferred polyetherimides for the purposes of the present invention include those where —O—A< and Z respectively are:

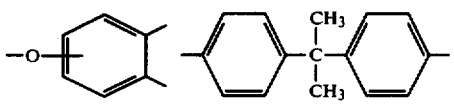

and R is selected from:

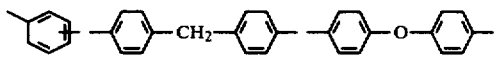

The polyetherimides where R is metaphenylene are most preferred.

The blends of the invention also include an EPDM terpolymer which is derived from ethylene, propylene and a diene. EPDM terpolymers are low unsaturated polymers having about 0.1 to about 10 mole % olefinic unsaturation defined according to the definition as found in ASTM-D-1418-64 and include terpolymers containing ethylene and propylene in the backbone and a diene in the side chain. Preferred EPDM polymers contain about 40 to about 80 wt. % ethylene and about 1 to about 10 wt. % of a diene monomer, the balance of the polymer being propylene. Preferably the polymer contains about 50 to about 60 wt. % ethylene, e.g. 50 wt. % and about 2.6 to about 9.0 wt. % diene monomer, e.g. 5.0 wt. %. The diene monomer is preferably a nonconjugated diene. Illustrative of these nonconjugated diene monomers which may be used in the EPDM terpolymer are 1,4 hexadiene, dicyclopentadiene, ethylidene norbornene, methylene norbornene, propenyl norbornene, and methyl tetrahydroindene.

EPDM terpolymers generally have a number average molecular weight of about 10,000 to about 200,000, more preferably of about 15,000 to about 100,000, most preferably of about 20,000 to about 60,000. The Mooney viscosity of EPDM terpolymers at (1+8) min. at 212° F. is about 5 to about 90, more preferably about 10 to about 50, most preferably about 15 to about 25. The $\overline{M}_v$ of EPDM terpolymers is preferably below about 350,000 and more preferably below about 300,000. The $\overline{M}_w$ of EDPM terpolymers is preferably below about 500,000 and more preferably below about 350,000.

Many grades of EPDM terpolymers are commercially available and these grades generally vary in molecular weight and in the stabilizers added to the particular grade. A typical EPDM terpolymer is Vistalon 3708 (Exxon Chemical Co.). Vistalon 3708 is a terpolymer having a Mooney viscosity at (1+8) min. at 212° F. of about 45-55 and having about 53 wt. % of ethylene, about 3.5 wt. % of 1,4 hexadiene, and about 43.5 wt. % of propylene.

The polyetherimides can be obtained by any of the methods well known to those skilled in the art including the reaction of any aromatic bis(ether anhydrides) of the formula

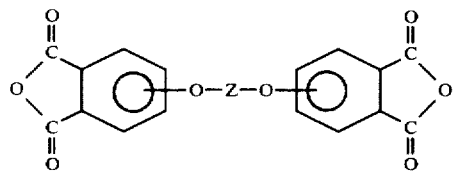

where Z is as defined hereinbefore with an organic diamine of the formula

H$_2$N—R—NH$_2$ where R is as defined hereinbefore.

Aromatic bis(ether anyhdride)s of the above formula include, for example, 2,2-bis[4-(2,3-dicarboxyphenoxy)-phenyl]-propane dianhydride; 4,4'-bis(2,3-dicarboxyphenoxy)diphenyl ether dianhydride; 1,3-bis(2,3-dicarboxyphenoxy)benzene dianhydride; 4,4'-bis(2,3-dicarboxyphenoxy)diphenyl sulfide dianhydride; 1,4-bis(2,3-dicarboxyphenoxy)benzene dianhydride; 4,4'-bis(2,3-dicarboxyphenoxy) benzophenone dianhydride; 4,4'-bis(2,3-dicarboxyphenoxy)diphenyl sulfone dianhydride; 2,2-bis[4-(3,4-dicarboxyphenoxy)phenyl]propane dianhydride; 4,4'-bis(3,4-dicarboxyphenoxy)diphenyl ether dianhydride; 4,4'-bis(3,4-dicarboxyphenoxy)-diphenyl sulfide dianhydride; 1,3-bis(3,4-dicarboxyphenoxy)benzene dianhydride; 1,4-bis(3,4-dicarboxyphenoxy)benzene dianhydride; 4,4'-bis(3,4-dicarboxyphenoxy)benzophenone dianhydride; 4-(2,3-dicarboxyphenoxy)-4'-(3,4-dicarboxyphenoxy)diphenyl-2,2-propane dianhydride; etc. and mixtures of such dianhydrides.

In addition, aromatic bis(ether anhydride)s also included by the above formula are shown by koton, M. M.; Florinski, F. S.; Bessonov, M. I.; Rudakov, A. P. (Institute of Heteroorganic compounds, Academy of Sciences, U.S.S.R.), U.S.S.R. 257,010, Nov. 11, 1969, Appl. May 3, 1967. In addition, dianhydrides are shown by M. M. Koton, F. S. Florinski, Zh Org. Khin, 4(5), 774 (1968).

Organic diamines of the above formula include, for example, m-phenylenediamine, p-phenylenediamine, 4,4'-diaminodiphenylpropane, 4,4'-diaminodiphenylmethane, benzidine, 4,4'-diaminodiphenyl sulfide, 4,4'-diaminodiphenyl sulfone, 4,4'-diaminodiphyenyl ether, 1,5-diaminonaphthalene, 3,3'-dimenthylbenzidine, 3,3'-dimethoxybenzidine, 2,4-bis(β-amino-t-butyl)toluene, bis(p-β-amino-t-butylphenyl)ether, bis(p-β-methyl-o-aminopentyl)benzene, 1,3-diamino-4-isopropylbenzene, 1,2-bis(3-aminopropoxy)ethane, m-xylylenediamine, p-xylylenediamine, 2,4-diaminotoluene, 2,6-diaminotoluene, bis(4-aminocyclohexyl)methane, 3-methylheptamethylenediamine, 4,4-dimethylheptamethylenediamine, 2,11-dodecanediamine, 2,2-dimethylopropylenediamine, octamethylenediamine, 3-methoxyhexamethylenediamine, 2,5-dimethylhexamethylenediamine, 2,5-dimethylheptamethylenediamine, 3-methylheptamethylenediamine, 5-methylnonamethylenedediamine, 1,4-cyclohexanediamine, 1,12-octadecanediamine, bis(3-aminopropyl)sulfide, N-methyl-bis(3-aminopropyl)amine, hexamethylenediame, heptamethylenediamine, nonamethylenediamine, decamethylenediamine, bis(3-aminopropyl) tetramethyldisiloxane, bis(4-aminobutyl) tetramethyldisiloxane, and the like.

In general, the reactions can be advantageously carried out employing well-known solvents, e.g., o-dichlorobenzene, m-cresol/toluene, etc. in which to effect interaction between the dianhydrides and the diamines, at temperatures of from about 100° to about 250° C. Alternatively, the polyetherimides can be prepared by melt polymerization of any of the above dianhydrides with any of the above diamino compounds while heating the mixture of the ingredients at elevated temperatures with concurrent intermixing. Generally, melt polymerization temperatures between about 200° to 400° C. and preferably 230° to 300° C. can be employed. The conditions of the reaction and the proportions of ingredients can be varied widely depending on the desired molecular weight, intrinsic viscosity, and solvent resistance. In general, equimolar amounts of diamine and dianhydride are employed for high molecular weight polyetherimides, however, in certain instances, a slight molar excess (about 1 to 5 mol percent) of diamine can be employed resulting in the production of polyetherimides having terminal amine groups. Generally, useful polyetherimides have an intrinsic viscosity [η] greater than 0.2 deciliters per gram, preferably 0.35 to 0.60, or 0.7 deciliters per gram or even higher when measured in m-cresol at 25° C.

Included among the many methods of making the polyetherimides are those disclosed in U.S. Pat. Nos. Heath et al., 3,847,867, Williams Pat. No. 3,847,869, Takekoshi et al., 3,850,885, White 3,852,242 and 3,855,178, etc. These disclosures are incorporated herein in their entirety by reference for the purpose of teaching, by way of illustration, general and specific methods for preparing polyetherimides suitable for the blends of this invention.

EPDM terpolymers can be made by a number of methods well known in the art. Illustrative methods for producing these terpolymers are found in U.S. Pat. No. 3,280,082, British Pat. No. 1,030,289 and French Pat. No. 1,386,600, which are incorporated herein by reference.

The amount of the polyetherimide and EPDM terpolymer in the blends of the invention may vary considerably but generally the amount of EPDM terpolymer is a minor amount, e.g., less than about 20 wt. %, preferably from about 0.1 to about 15 wt. %, most preferably about 1 to 10 wt. %, based on the combined weight of the polyetherimide and EPDM terpolymer components of the blend.

In general, blends of polyetherimides and EPDM terpolymers can be tailored, within limits, to provide desired physical characteristics by selecting appropriate proportions of blend components. Higher proportions of polyetherimide usually contribute higher mechanical properties and higher heat deflection temperatures for the blend. Higher proportions of EPDM terpolymer generally provide higher notched impact strength for the blend.

It is contemplated that the polyetherimide-EPDM terpolymer blends of the present invention may also include additive materials such as fillers, stabilizers, plasticizers, flexibilizers, surfactant agents, pigments, dyes, reinforcements, flame retardants and diluents in conventional amounts. It is also contemplated that the blends of the invention may include two or more polyetherimides with one or more EPDM terpolymers or two or more EPDM terpolymers in combination with one or more polyetherimides.

Methods for forming polyetherimide-EPDM terpolymer blends may vary considerably. Prior art blending techniques are generally satisfactory. A preferred method comprises blending the polymers and additives such as reinforcements in powder, granular or filamentous form, extruding the blend, and chopping the extrudate into pellets suitable for molding by means conventionally used to mold normally solid thermoplastic compositions.

The polyetherimide-EPDM terpolymer blends of the present invention have application in a wide variety of physical shapes and forms, including the use as films, molding compounds, coatings, etc. When used as films or when made into molded products, these blends, including laminated products prepared therefrom, not only possess good physical properties at room temperature but they retain their strength and excellent response to workloading at elevated temperatures for long periods of time. Films formed from the blends of this invention may be used in application where films have been used previously. Thus, the blends of the present invention can be used in automobile and aviation applications for decorative and protective purposes, and as high temperature electrical insulation for motor slot liners, transformers, dielectric capacitors, coil and cable wrappings (form would coil insulation for motors, and for containers and container linings. The blends can also be used in laminated structures where films or solutions of the blend are applied to various heat-resistant or other type of materials such as asbestos, mica, glass fiber and the like, the sheets superimposed one upon the other, and thereafter subjecting the sheets to elevated temperatures and pressures to effect flow and cure of the resinous binder to yield cohesive laminated structures. Films made from the subject polyetherimide-EPDM terpolymer blends can also serve in printed circuit applications.

Alternatively, solutions of the blends herein described can be coated on electrical conductors such as copper, aluminum, etc. and thereafter the coated conductor can be heated at elevated temperatures to remove the solvent and provide a continuous resinous composition thereon. If desired, an additional covercoat may be applied to such insulated conductors including the use of polymeric coatings, such as polyamides, polyesters, silicones, resins, epoxy resins, polyimides, polytetrafluoroethylene, etc. The use of the blends of the present invention as overcoats on other types of insulation is not precluded.

Other applications which are contemplated for these blends include their use as binders for asbestos fibers, carbon fibers, and other fibrous materials in making brake linings. In addition, molding compositions and molded articles may be formed from the polymeric blends of the invention preferably by incorporating such fillers as asbestos, glass fibers, talc, quartz powder, finely divided carbon, silica, and the like into the blends prior to molding. Shaped articles may be formed under heat, or under heat and pressure, in accordance with practices well-known in the art.

The following examples illustrate specific polyetherimide-EPDM terpolymer blends in accordance with the present invention. It should be understood that the examples are given for the purpose of illustration and do not limit the invention. In the examples, all parts and percentages are by weight unless otherwise specified.

EXAMPLE I

A polyetherimide-EPDM terpolymer blends according to the invention were prepared, the blends molded into test specimens and the specimens tested for various physical properties.

The polyetherimide was prepared from the reaction product of essentially equimolar amounts of 2,2-bis[4-(3,4-dicarboxyphenoxy) phenyl]propane dianhydride and m-phenylene diamine produced at elevated temperature of about 250° to about 300° C. and under a nitrogen atmosphere. The polymer was extruded at about 300° C. to form a strand and mechanically chopped into pellets. A test specimen was injection molded from the pellets at a temperature of about 685°–700° F.

The EPDM terpolymer used in forming the blends was a terpolymer sold commercially under the trade name Nordel 1560 by E. I. du Pont de Nemours & Co., Inc., Wilmington, Del. This EPDM terpolymer is a hydrocarbon crystalline rubber characterized by high viscosity and high strength.

Three mixtures of the components were then prepared, the mixtures containing about 1%, about 5% and about 10% EPDM terpolymer respectively, the remainder of each mixture being polyetherimide. The blend mixtures were then extruded in a Werner & Pfleiderer extruder having a temperature profile varying from about 315° to 332° C. The resulting extrudates were comminuted into pellets and the pellets injection molded into test specimens at a temperature of about 321° C. to 343° C. Impact strengths of these specimens as well as of the specimen of the polyetherimide were measured according to the notched Izod test, and the results are set forth in the Table. The heat deflection temperature, flexural strength, flexural modulus and tensile properties of each of the specimens were also determined and are given in the following Table. All three of the blends were opaque in appearance.

EXAMPLE II

The procedure of Example I was repeated with the exception that the EDPM terpolymer used to produce the blends according to the invention was a terpolymer sold under the trade name Epcar 306 G-8 by the B. F. Goodrich Company, Akron, Ohio. This EDPM terpolymer has a low molecular weight and viscosity. In addition, the extruder temperature profile varied from about 315° to 327° C. and the molding temperature was between 321° and 327° C. The results of the notched Izod impact test, as well as the heat deflection temperature, flexural strength, flexural modulus and tensile properties for the test specimens of the blends are detailed in the Table. All three of the blends were opaque in appearance.

EXAMPLE III

The procedure of Example I was repeated with the exception that an EPDM terpolymer sold under the tradename Royalene IM 7100 by Uniroyal, Inc., New York, N.Y. was used to produce the blends according to the invention. The EDPM terpolymer is based on Royalene 539, a material with a relatively high viscosity. In addition, the extruder temperature profile varied from about 315° to 327° C. The results of the notched Izod impact test, as well as the heat deflection temperature, flexural strength, flexural modulus and tensile properties for the test specimens of the blends are detailed in the Table. All three of the blends were opaque in appearance.

EXAMPLE IV

The procedure of Example II was repeated with the exception that an EPDM terpolymer sold under the tradename Royalene IM 7473 by Uniroyal, Inc. was used to produce the blends according to the invention. This EPDM terpolymer is based on about 70% Royalene 100, a material with good resistance to low temperature impact, and about 30% polypropylene with a MFI of greater than about 7. In addition, the molding temperature was between 327° and 349° C. The results of the notched Izod impact test, as well as the heat deflection temperature, flexural strength, flexural modulus and tensile properties for the test specimens of the blends are detailed in the Table. The blends were opaque in appearance.

EXAMPLE V

The procedure of Example I was repeated with the exception that an EPDM terpolymer sold under the tradename Royalene IM 7475 by Uniroyal, Inc., was used to produce the blends according to the invention. This EPDM terpolymer is based on about 70% Royalene 100 and about 30% polyethylene with a MI of about 2 to 6. In addition, the extruder temperature profile varied from about 315° to about 327° C. The results of the notched Izod impact test, as well as the heat deflection temperature, flexural strength, flexural modulus and tensile properties for the test specimens of the blends are detailed in the Table. The blends were opaque in appearance.

As is apparent from the above test results, all of the blends have a significantly improved notched impact strength over the polyetherimide component alone. The maximum improvement in notched Izod impact strength was obtained with the blend containing about 10% Royalene IM 7473 where an increase by a factor of about 3.5 was obtained. In all the blends with the exception of the blend of Example I containing Nordel, the notched Izod impact strength was over about 2.1 ft-lb/in with the majority of the blends having a notched impact strength over about 3.0 ft-lb/in at a 10% EPDM terpolymer content.

TABLE

| Example | % EPDM Terpolymer | Izod Impact[1] (ft-lb/in) Notched | Izod Impact[1] (ft-lb/in) Un-notched | Heat Deflection Temperature[2] (°C. at 1.82mPa) | Flexural properties[3] Initial Modulus (PSI × $10^5$) | Flexural properties[3] Strength @ 6.2mm Def (PSI × $10^4$) | Flexural properties[3] Ultimate Strength (PSI × $10^4$) | Tensile Properties[4] Yield % | Tensile Properties[4] (PSI × $10^4$) | Tensile Properties[4] Failure % | Tensile Properties[4] (PSI × $10^4$) |
|---|---|---|---|---|---|---|---|---|---|---|---|
| I | 0 | 1.1 | 26.5 | 186 | 5.02 | 2.10 | 2.51 | 18 | 1.54 | 36 | 1.23 |
|   | 1 | 1.1 | 18.1 | 181 | 4.79 | 1.98 | 2.30 | 17 | 1.49 | 32 | 1.22 |
|   | 5[5] | 1.5 | 6.7 | 184 | 4.33 | 1.67 | 1.76 | — | — | 9 | 0.98 |
|   | 10[5] | 1.5 | 8.4 | 181 | 3.59 | 1.05 | 1.10 | — | — | 6 | 0.757 |
|   | 10 | 1.7 | 8.7 | 174 |  |  |  |  |  |  |  |
| II | 1 | .3 | 6.8 | 188 | 4.63 | 2.04 | 2.27 | — | — | — | 1.42 |
|   | 5 | 1.5 | 8.6 | 182 | 4.11 | 1.39 | 1.47 | — | — | — | 0.94 |
|   | 10 | 1.3 | 6.7 | 176 | 3.46 | 0.79 | 0.88 | — | — | — | 0.50 |
| III | 1 | 1.2 | 77.8 | 182 | 4.67 | 1.23 | 1.69 | 16 | 1.46 | 43 | 1.17 |
|   | 5 | 1.6 | 9.3 | 182 | 4.28 | 1.66 | 1.73 | — | — | 8 | 0.766 |
|   | 10 | 2.1 | 20.2 | 178 | 3.82 | — | 1.48 | — | — | 10 | 0.813 |
| IV | 1 | 0.9 | 17.3 | 177 | 4.63 | 1.85 | 2.16 | — | — | 12 | 1.31 |
|   | 5 | 1.7 | 5.9 | 187 | 3.76 | 1.29 | 1.40 | — | — | 10 | 0.790 |
|   | 10 | 3.9 | 4.6 | 179 | — | — | — | — | — | — | — |
| V | 1 | 1.2 | 21.5 | 180 | 4.65 | 1.82 | 2.19 | — | — | 18 | 0.998 |
|   | 5 | 1.8 | 6.4 | 187 | 3.86 | 1.24 | 1.35 | — | — | 8 | 0.689 |
|   | 10 | 3.1 | 5.7 | 181 | 3.00 | 0.605 | 0.62 | — | — | 8 | 0.383 |

[1]Tested according to ASTM method D 256; unnotched bar contains notch on back side.
[2]Tested according to ASTM method D 648 using a 3.2mm bar.
[3]Tested according to ASTM method D 790 using a 3.2mm bar at a 1.27mm/min crosshead speed.
[4]Tested according to ASTM method D 638 using Tpe 1 bar with a 5.08mm/min crosshead speed.
[5]Polyetherimide used was different and had a notched Izod value of 0.7 ft-lb/in, a unnotched Izod value of 30.9 ft-lb/in and a heat distortion temperature of 192° C.

It can also be observed that the unnotched Izod impact strength of the blends is below that of the polyetherimide component alone, particularly when the EPDM content is about 10%. The lowered unnotched impact strengths are probably due to the formation of two phases within the blend which causes delamination upon impact and thus lowered impact strength. Furthermore, the heat deflection temperature for the blends does not vary significantly from that of the polyetherimide component by itself while flexural and tensile properties of the blends are somewhat less than that for the polyetherimide.

In summary, blends according to the invention have an improved notch sensitivity at the expense of tensile and flexural properties. Blends containing Royalene IM 7100 appear to have the best overall balance of properties with a significantly improved notched Izod impact strength and with adequate unnotched Izod impact strength and flexural and tensile properties.

Substitution of other polyetherimides and/or other EPDM terpolymers for the polyetherimide and/or terpolymers of the blends of the above examples can result in the formulation of polyetherimide-EPDM terpolymer blends having similar characteristics such as improved notch sensitivity and such blends are considered within the scope of the invention.

While the present invention has been described with reference to particular embodiments thereof, it will be understood that numerous modifications may be made by those skilled in the art without actually departing from the spirit and scope of the invention as defined in the appended claims.

We claim:

1. A composition comprising a blend of (a) a minor proportion of an EPDM terpolymer and (b) a polyetherimide.

2. A composition in accordance with claim 1 wherein the EPDM terpolymer contains about 40 to about 80 wt. % ethylene, about 1 to about 10 wt. % diene monomer, the remainder propylene.

3. A composition in accordance with claim 2 wherein the EPDM terpolymer contains about 50 to 60 wt. % ethylene, about 2.6 to about 9 wt. % diene monomer.

4. A composition in accordance with claim 2 or 3 wherein the diene monomer is selected from 1,4-hexadiene, diocyclopentadiene, ethylidene norbornene, methylene norbornene, propenyl norbornene and methyl tetrahydroindene.

5. A composition in accordance with claims 1, 2, or 3 wherein the polyetherimide has the formula:

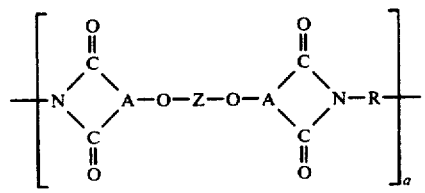

where a represents a whole number in excess of 1, the group —O—A< is selected from:

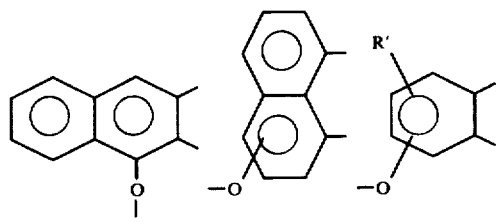

R' being hydrogen, lower alkyl or lower alkoxy, Z is a member of the class consisting of (1)

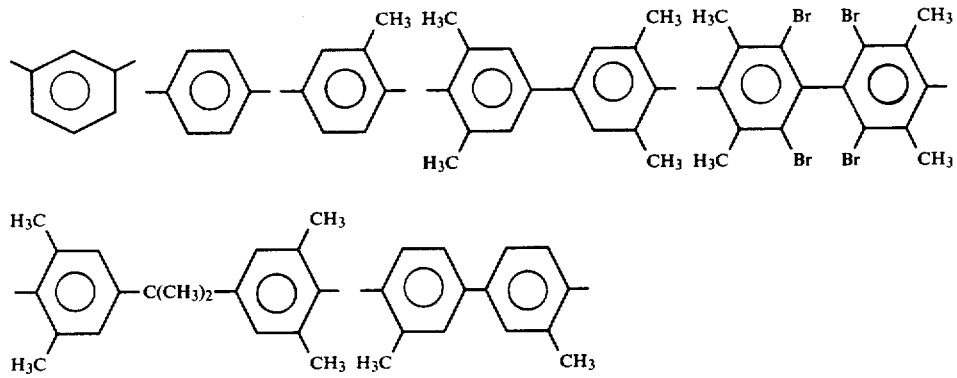

and (2) divalent organic radicals of the general formula:

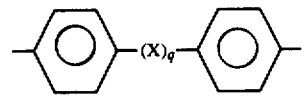

where X is a member selected from the class consisting of divalent radicals of the formula,

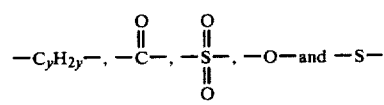

where q is 0 or 1, y is a whole number from 1 to 4, and R is a divalent organic radical selected from the class consisting of (1) aromatic hydrocarbon radicals having from 6-20 carbon atoms and halogenated derivatives thereof, (2) alkylene radicals and cycloalkylene radicals having from 2-20 carbon atoms, $C_{(2-8)}$ alkylene terminated polydioganosiloxane, and (3) divalent radicals included by the formula

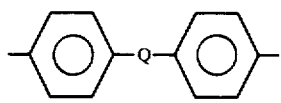

where Q is a member selected from the class consisting of

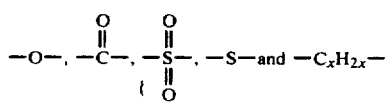

where x is a whole number from 1 to 5 inclusive.

6. A composition in accordance with claim 5 wherein the polyetherimide is of the formula;

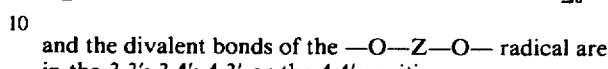

and the divalent bonds of the —O—Z—O— radical are in the 3,3'; 3,4'; 4,3' or the 4,4' position 7. A composition in accordance with claim 6 wherein Z is;

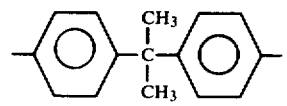

and R is selected from;

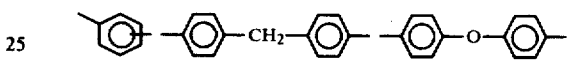

8. A composition in accordance with claim 7 wherein the polyetherimide is of the formula:

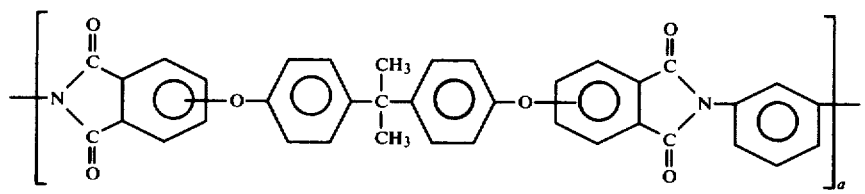

* * * * *